United States Patent [19]

Inselberg

[11] Patent Number: 4,823,272

[45] Date of Patent: Apr. 18, 1989

[54] N-DIMENSIONAL INFORMATION DISPLAY METHOD FOR AIR TRAFFIC CONTROL

[75] Inventor: Alfred Inselberg, Los Angeles, Calif.

[73] Assignee: International Business Machines Corporation, Armonk, N.Y.

[21] Appl. No.: 22,832

[22] Filed: Mar. 6, 1987

[51] Int. Cl.$^4$ .............................................. G06F 15/48
[52] U.S. Cl. ...................................... 364/461; 364/439
[58] Field of Search ........................ 364/461, 439, 460; 342/455, 456, 29

[56] References Cited

U.S. PATENT DOCUMENTS

| | | | |
|---|---|---|---|
| 3,534,367 | 10/1970 | Laughlin et al. | 364/439 |
| 3,775,767 | 11/1973 | Fielding | 364/439 |
| 3,925,750 | 12/1975 | Gilbert et al. | 340/27 NA |
| 3,971,025 | 7/1976 | Levine | 343/108 R |
| 3,996,590 | 12/1976 | Hammack | 343/112 R |
| 4,023,158 | 5/1977 | Corcoran | 340/324 R |
| 4,196,474 | 4/1980 | Buchanan et al. | 364/461 |
| 4,706,198 | 11/1987 | Thurman | 364/461 |

OTHER PUBLICATIONS

Findler, Air Traffic Control: A Challenge for Artificial Intelligence, 1/87, pp. 59-66, AI Expert.
Inselberg, "Intelligent Instrumentation and Process Control", Proc. of the 2nd Conf. on AI Applications, IEEE, Dec. 11-13, 1985, pp. 302-307 (and cited refs.).
Edna E. Kramer, "The Nature and Growth of Modern Mathematics", Princeton University Press, copyright 1981, p. 160.
Aleksandrov et al, "Mathematics, Its Content, Methods, and Meaning", MIT Press, copyright 1963, vol. 2, pp. 108-110.
Barton, "Radar Systems Analysis", Prentice-Hall, copyright 1964, pp. 381-393 and 428-435.
Gilman et al, "APL: An Interactive Approach", 2nd Ed., John Wiley & Sons, copyright 1976.
APL2 Language Manual, IBM Publication SB21-3015.

Primary Examiner—Parshotam S. Lall
Assistant Examiner—Thomas G. Black
Attorney, Agent, or Firm—R. Bruce Brodie

[57] ABSTRACT

Critical differences in the position and motion of aircraft in congested N-dimensional airspace are highly discernible when processed and mapped onto a parallel N-coordinate plane. Trajectory intersection in both time and space may be constantly monitored. The airspace may be accurately controlled by descriptively and prescriptively configuring proposed trajectories and monitoring critical differences before assignment to aircraft. Attributes such as angular deviation, in addition to closing speed and distance, can be evaluated.

11 Claims, 10 Drawing Sheets

ANGULAR DEVIATIONS IN ASSIGNED TRAJECTORIES SHOW AS LATERAL DEVIATIONS IN PARALLEL COORDINATES

Four-dimensional tracker.

Data processing with remote computer.

PATH (LEFT) AND TRAJECTORY (RIGHT) OF AN AIRCRAFT

PATHS (LEFT) AND TRAJECTORIES (RIGHT)
OF SEVERAL AIRCRAFT

MISLEADING APPEARANCES IN 3-D ARE RESOLVED
WELL IN PARALLEL COORDINATES

ANGULAR DEVIATIONS IN ASSIGNED TRAJECTORIES SHOW AS
LATERAL DEVIATIONS IN PARALLEL COORDINATES

CLOSEST APPROACH OF TWO AIRCRAFT

IN PARALLEL COORDINATES THE TIME AT WHICH
THE AIRCRAFT WILL BE CLOSEST AND THEIR
CORRESPONDING POSITIONS ARE SHOWN

SEPARATION IN SPACE

TWO AIRCRAFT FLYING SEPARATELY ON THE
SAME PATH WITH THE SAME VELOCITY

THE AIRCRAFT FLYING STRAIGHT-LINE TRAJECTORIES
FOR VARIOUS TIME INTERVALS

THE AIRCRAFT FLYING STRAIGHT-LINE SEGMENTS

COLLISIONS WHICH MAY BE UNCLEAR IN 3-D
ARE RESOLVED IN PARALLEL COORDINATES

SEGMENTS SHOWING INTERSECTION IN SPACE AND TIME
(ENLARGEMENT OF FIG. 10)

PARALLEL AXES FOR $R^N$

INTERSECTING LINES IN $R^5$

INTERSECTION OF TWO LINES IN $R^5$

N-DIMENSIONAL INFORMATION DISPLAY METHOD FOR AIR TRAFFIC CONTROL

TECHNICAL FIELD

This invention relates to air traffic control and, more particularly, to the automatic processing and presentation of aircraft trajactory data to facilitate collision avoidance and routing.

BACKGROUND

In the prior art, it is known that the position and motion of aircraft in an airspace can be periodically detected and measured by an active or passive detection and ranging system. The ranging system sends the periodically obtained information in the form of coded signals to a processor and an associated interactive interface. In turn, the processor causes the signals to be transformed and displayed at the interface. The interface may include a surface such as a polychromatic cathode ray tube upon which the aircraft position information is shown, means coupling the processor for varying the display, means for controlling the detection and ranging system, and means for communicating with aircraft. Such a system, although frequently sited on the ground, may likewise be air or seaborne.

Typifying the prior art patent literature are:

(1) Buchanan et al, U.S. Pat. No. 4,196,474, "Information Display Method and Apparatus for Air Traffic Control", issued Apr. 1, 1980.

(2) Corcoran, U.S. Pat. No. 4,023,158, "Real Three-dimension Visual Display Arrangement", issued May 10, 1977.

(3) Hammack, U.S. Pat. No. 3,996,950, "Method and Apparatus for Automatically Detecting and Tracking Moving Objects and Similar Applications", issued Dec. 7, 1976.

(4) Levine, U.S. Pat. No. 3,971,025, "Airport Ground Surveillance System with Aircraft Taxi Control Feature", issued July 20, 1976.

(5) Gilbert et al, U.S. Pat. No. 3,925,750, "Air Traffic Control System", issued Dec. 9, 1975.

These references describe systems and methods for providing the near real-time isometric display of state variable data (aircraft identity, position, velocity) in two and three dimensions. However, significant dimensional information may be lost. For instance, a 2-dimensional radar display may show position (range) but no height data. Alternatively, position information may be shown in polar coordinates dimensionally graphed, but other information such as height and ground speed may appear only as numerical tags to the display blip.

Notwithstanding, recent years have witnessed a crowding of the skies around air traffic control (ATC) sites with increasing numbers of both scheduled and nonscheduled aircraft seeking entrance or exit from or to designated airspace and ground facilities. One consequence is the crowding of information appearing at the counterpart ATC displays. This means that ATC personnel and others utilizing the displays may overlook data present, not notice data absent, and otherwise misinterpret the system state. This becomes critical where the displayed data concerns potential collisions involving closing distances and velocities among aircraft. Parenthetically, Gilbert, in FIG. 6, exhibits a typical crowded airborne ATC display.

Another source of prior art relates to a theory of optimal control systems using N-dimensional geometry. This is taught by:

(6) Inselberg et al, "Intelligent Instrumentation and Process Control", Proceedings of the Second Conference on AI Applications, IEEE, Dec. 11–13, 1985, pp. 302–307, and references cited therein.

According to Inselberg, an N-dimensional/coordinate geometry may be used to characterise N mensurable attributes of each object in a system. Relatedly, process control consists of maintaining some relations defined on those attributes invariant and others constrained. Optimal process control is one in which:

(a) interior points (points in N-space) to a hypersurface represent the acceptable states of a system model, (b) control requires staying within the interior of said surface, and (c) a current abbreviated description of the system state, i.e., display, involves the mapping of points in N-space into convenient 2-dimensional form.

Inselberg proposes that the N-dimensional to 2-dimensional mapping for a display be in the form of N axes parallel, say, to the y-axis in the xy-plane. Each point in the higher dimension can have its N coordinates $(c_1, c_2, c_3, \ldots, c_N)$ depicted as a polygonal line in the xy-plane. At page 305, he points out that a general convex hypersurface in N-dimensions can be represented by the "envelope" of the set of polygonal lines. This is analogous to the 2- or 3-dimensional space of defining a curve as the "envelope" of its tangents, and defining a surface as the "envelope" of its tangent planes. Reference also can be made to Edna E. Kramer, "The Nature and Growth of Modern Mathematics", Princeton University Press, copyright 1981, page 160; and Aleksandrov et al, "Mathematics, Its Content, Method, and Meaning", MIT Press, copyright 1963, Vol 2, pp. 108–110.

The Inselberg article further points out several properties of this hypersurface envelope as mapped onto the xy-plane. First, a "feasible point" satisfying control requirements is interior to the hypersurface. Second, the relation between adjacent ones of the N-parallel axes is defined by the envelope shape. Third, the envelope shape is dependent upon the order in which the axes appear. Lastly, varying the order permits a way of finding and displaying these "feasible points".

THE INVENTION

It is an object of this invention to devise a method for the processing and displaying of system state data, especially variable data, in an air traffic control (ATC) system context. It is a related object to devise a method for ATC collision avoidance and routing in which the processed and displayed data explicitly show aircraft trajectories in the form of time and space variables. It is still another object to devise a collision avoidance method and maintenance of acceptable spatial separation between aircraft at the time trajectories are assigned to corresponding aircraft. It is yet another object that such method avoid dimensional information loss, such as is occasioned by resource to present-day methods.

This invention is premised upon the unexpected observation that trajectories of aircraft measured frequently enough as points in a space of four or more dimensions can be mapped into an electronically displayable plane of four or more parallel coordinate axes in the form of three labeled points. It is also appreciated that a point of collision between two aircraft trajectories in this higher dimension space can be processed as a "point in time" of intersection of a pair of lines and manifest likewise as a polygonal line on the electronically displayable plane. Likewise, a zone of either collision danger or avoidance modeled as a "sphere" about a point of intersection or as a cylindrical or other shaped volume about each actual or proposed trajectory in the higher dimensional space can be mapped onto the display. Similarly, any angular deviations from an assigned trajactory are mappable as a lateral deviation on the display.

The invention is embodied as a method for detecting and displaying position and motion information among objects distributed in a volume, said information being periodically supplied by a suitable active or passive detection and ranging system in the form of coded signals to a processor and an associated interactive interface.

In this invention, an aircraft trajectory is considered to be a relation between three space variables and time. While the trajectory may be curved in fact, if it is sampled frequently enough, the trajactory may be approximated and processed as if it were linear. The sampling consists of the coded signal returns provided by the detection and ranging system on a periodic basis to the processor and interactive display. Curved trajectories can be directly processed at increased cost.

The methods steps comprise (a) generating and displaying at the interface visible indicia of an N-axis parallel coordinate plane, N being a positive integer; (b) populating the displayed plane with display representations of polygonal lines, each line representing a unique N-tuple, and N-tuple being either a multivariate data point obtained from the received encoded signals or a point derived from said signals and satisfying a predetermined relation; (c) filtering the displayed populated plane to discriminate the attibutes, such as closing distance and velocity, as a function of their N-dimensional structure; and (d) base collision avoidance and routing algorithms on the geometrical representation.

BRIEF DESCRIPTION OF THE DRAWING AND TABLE

FIGS. 1A and 1B depict an aircraft detection and ranging system coupling a processor and interactive display means according to the prior art.

FIGS. 2-3 contrast single and multiple aircraft paths in three coordinate planes fashionable in the prior art with trajectories mapped onto parallel 4-axis coordinate display planes according to the method of the invention.

FIG. 4 illustrates the ambiguity of aircraft on an apparent collision course observed on prior art ATC display means and the express resolution on the parallel 4-axis coordinate display plane of the invention.

FIG. 5 sets out the manner by which angular deviation from assigned trajectories is displayed as lateral deviation per the invention.

FIGS. 6-11 depict the representation of aircraft on a collision course in both prior art and parallel 4-axis coordinate plane displays emphasizing the manner by which critical time and space intersection information is delineated according to the invention.

FIGS. 12-14 briefly show conceptual "mapping" of the geometric representation residues, in parallel coordinates, possible conflicts, and how it may be used for collision avoidance and trajectory assignment.

FIG. 15 shows the flow of control in detecting and displaying aircraft trajectories, and ascertaining collision opportunities and avoidances.

Table 1 sets out APL source code sequences following the general control flow of FIG. 15 for implementing the method of the invention when executed on a suitable APL processor portion of an ATC system.

DESCRIPTION OF THE PREFERRED EMBODIMENT AND INDUSTRIAL APPLICABILITY

Although the bulk of the following description is in connection with a display for air traffic control collision avoidance, the concepts of the invention include a method for detecting and displaying position and motion information among objects distributed in an N-dimensional space. The information is periodically supplied in the form of signals encoding multivariate data points. The encoded signals are sent to a processor and an associated interactive display interface.

Under the control of the processor, an N axes parallel coordinate plane is generated and displayed at the interface (N is a positive integer), and the displayed plane is populated with representations of polygonal lines, each line representing a unique N-tuple. The N-tuple is either a multivariate data point obtained from the received encoded signals, or a point derived from those signals and satisfying a predetermined relationship. The processor then controls the step of filtering the displayed populated plane to discriminate selected attributes, such as closing distance and velocity as a function of their N-dimensional structure.

Figure 2:
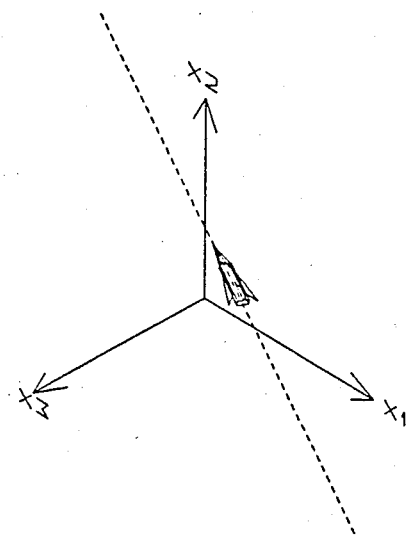
Figure 2:
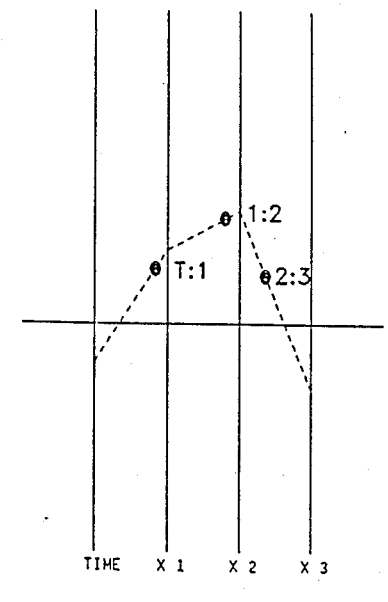
Figure 5:
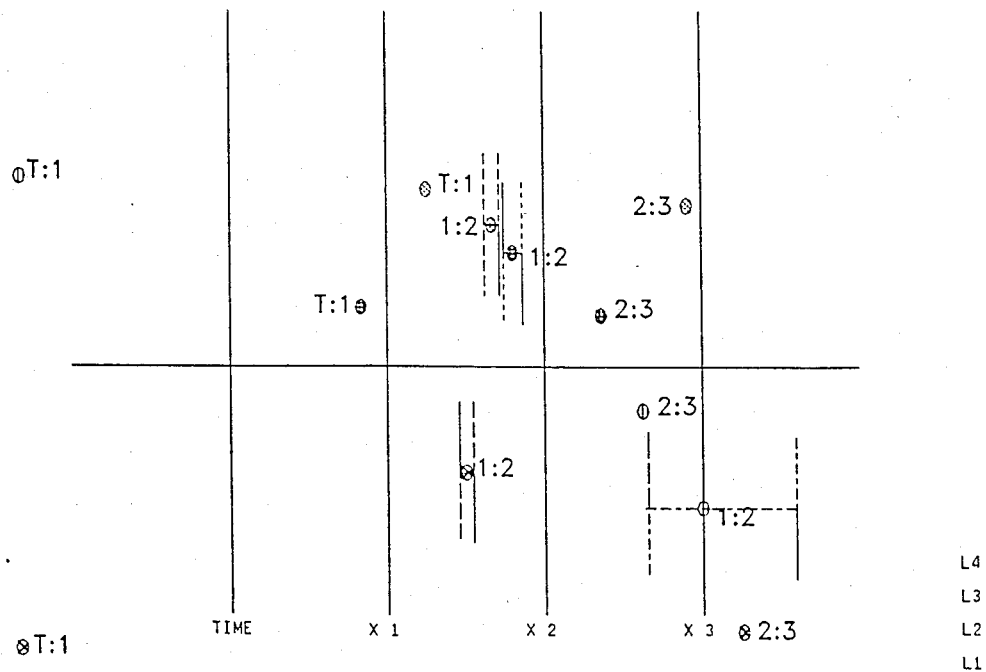

The displayed plane may include a velocity axis and, orthogonal to the velocity axis, four parallel coordinate axes formed from three axes of spatial dimension and one axis of temporal dimension, as shown in FIG. 2 in connection with displaying the trajectory of an aircraft. With the polygonal line representations in the displayed plane, angular deviations of an object moving through a trajectory are manifest on the displayed plane by lateral deviations about predetermined planar points as shown in FIG. 5. Each angular deviation may be extracted, processed, and displayed as the slope $m(i)$ of the polygonal lines projection onto a 2-dimensional space of adjacent parallel axes $x(i)$, $x(i+1)$, as described in more detail below.

A linear approximation to a designated segment of a trajectory for each object being may be defined by at least two N-tuples and may be manifest on the displayed plane as an area bounded by polygonal lines, as described in more detail below and illustrated in FIGS. 9 and 10. Objects that have intersecting trajectories are manifest on the displayed plane in the form of bounded areas bound by polygonal lines, with the bounded areas having no discernible separation on any of the parallel coordinate axes. Visible indication may be displayed on the interface of trajectories whose discernible separation as mapped onto at least one parallel coordinate in the planar displays less than a predetermined amount.

Figure 1:
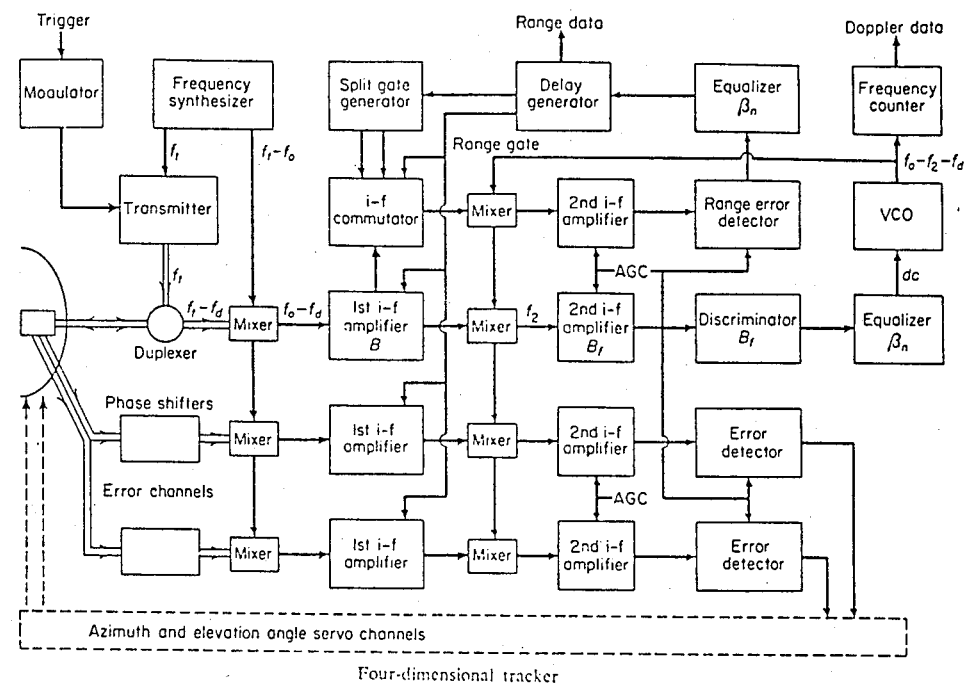
Figure 1:
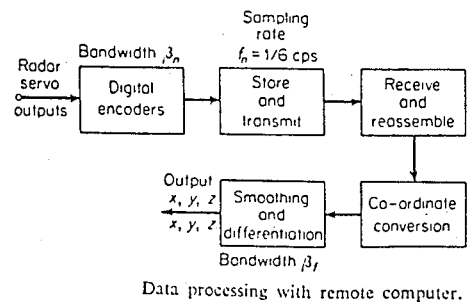

Referring now to FIG. 1, there is shown an active detection and ranging system used in the prior art to illuminate targets with electromagnetic waves and ascertain target identity, position, and motion. These target attributes are obtained from modulations encrusted on the echoes by interaction between the waves and the target. In the 4-dimensional rader tracker portion, position and movement data such as range 1, azimuth and elevation angles 5, 7, and Doppler data 3 are supplied to a processor/interactive interface (not shown). A portion of the conventional processing of position information responsive to azimuth and elevation angle data is set out in the lower portion of FIG. 1.

Passive systems, such as identify friend or foe (IFF) transponders embedded in targets, may also provide some of the same information. Processors converting the data also drive the displays. Additional description of radar systems may be found in Barton, "Radar Systems Analysis", Prentice-Hall, Inc., copyright 1964, pp. 381–393 and 428–435. Also, Levine (reference 4) shows a geometric arrangement of "blinking" radars in combination with a processor and 2-dimensional target display to regulate aircraft ground (taxi) movement. Since the invention concerns processing and display of target data already acquired, no additional description of detection and ranging systems is believed necessary in order to otherwise appreciate the advance set out in this specification.

Referring now to FIG. 2, there is shown a contrasting depiction of an aircraft in an isometric display on the left, and in a parallel 4-coordinate plane on the right. In the isometric display, both the relative position of the aircraft and an indication of the path followed are set out.

In FIG. 2, the parallel coordinate plane on the right is formed such that the axes are placed parallel and equidistant from each other. Since the aircraft position and motion are described in three spatial dimensions and one temporal dimension, then each such "point" in 4-space may be plotted uniquely in this parallel plane. One comparison between the left and right depictions is that the trajectory (the relation between space variables and time) can be represented and displayed on the parallel plane explicitly, whereas only the path can be indicated on the other.

Figure 3:
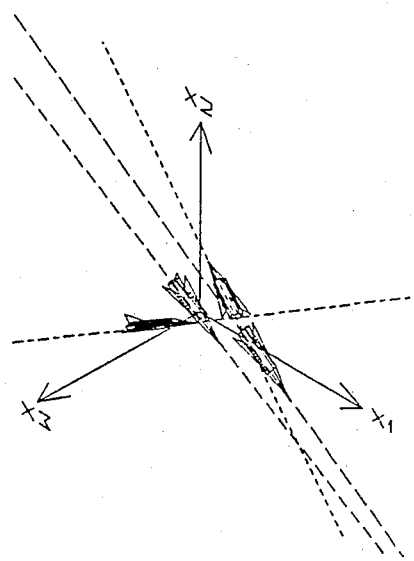
Figure 3:
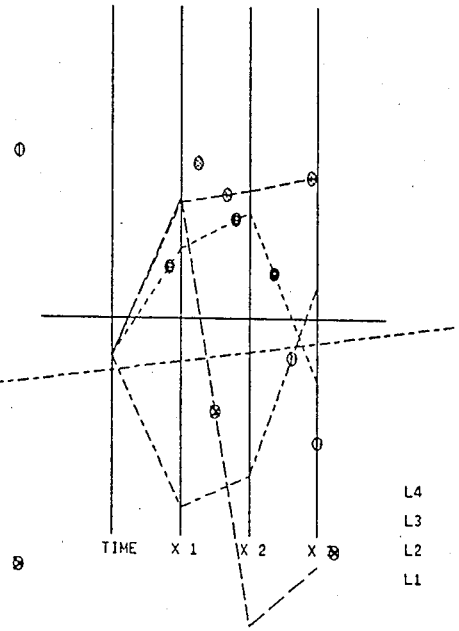

In FIG. 3, the paths and counterpart trajectories of several aircraft are shown in a manner similar to that shown in FIG. 2. The contrasting depictions are likewise set out in FIGS. 4 and 6–11. In order to more fully appreciate the significance of the parallel N-coordinate representation of aircraft position and movement information over that in the prior art requires a brief excursion.

Figure 12:
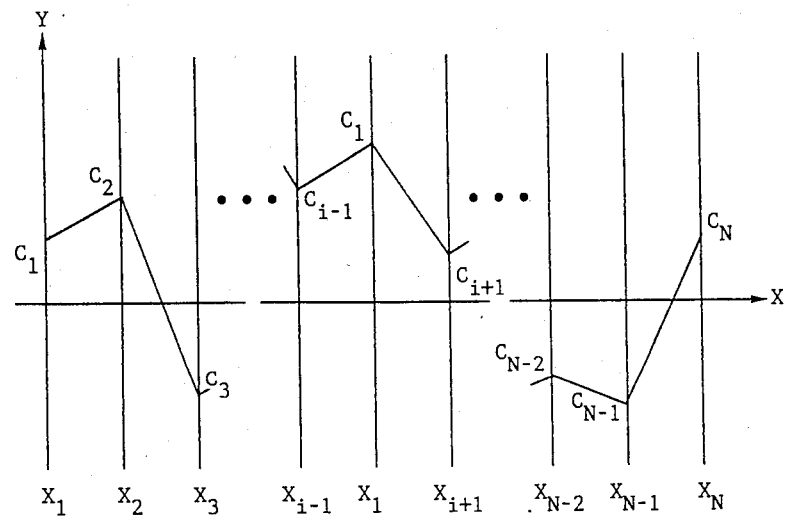
Figure 13:
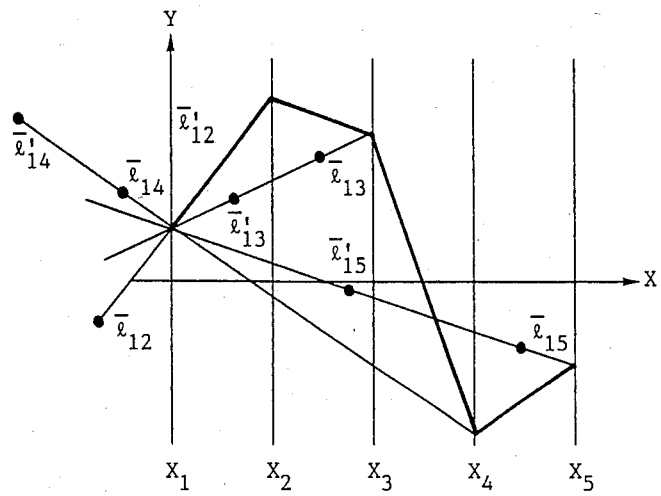
Figure 14:
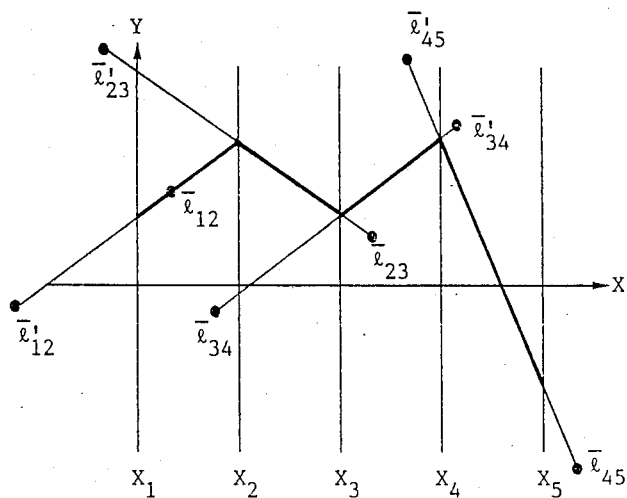

The key to understanding the parallel plane representation is to be found in FIGS. 12–14. First, a Cartesian or xy-plane is defined in FIG. 12. Second, starting with the y-axis and in the direction along the x-axis, N copies of the real number line are spaced equidistant and perpendicular. These are the axes of the parallel coordinate system for N-space. The axes all have the same positive orientation as the y-axis. The description of geometrical system having N variables in N-space is denoted in the literature as $R^N$.

In FIG. 12, a point c having N-coordinates (c1, c2, . . . , cN) is represented as a polygonal line whose N vertices are at $(i-1, c_i)$ on the x-axis for all i=1, 2, . . . , N. In this way, a one-to-one coorespondence between points in $R^N$ and planar polygonal lines with vertices in x1, x1, . . . , xN is established. For each segment joining vertices on adjacent axes, the whole line containing it is taken as part of the polygonal line representing the point. This polygonal line is made up of N−1 lines, each of which can be described by an independent linear equation. This set of equations can be satisified by the coordinates of its points. The equations can be expressed either in terms of adjacent variables or in terms of a single variable.

In terms of adjacent variables:

$$l_{12}: \quad x_2 = m_2 x_1 + b_2 \tag{1}$$
$$l_{23}: \quad x_3 = m_3 x_2 + b_3$$
$$\ldots$$
$$l_{i-1,i}: \quad x_i = m_i x_{i-1} + b_i$$
$$\ldots$$
$$l_{N-1,N}: \quad x_N = m_N x_{N-1} + b_N, \text{ or}$$

in terms of a single variable, the base variable, which after appropriate relabeling, can be taken as $x_1$, i.e., $$l_{12}: \quad x_2 = m_2^1 x_1 + b_2^1 \tag{2}$$
$$l_{13}: \quad x_3 = m_3^1 x_1 + b_3^1$$
$$\ldots$$
$$l_{1i}: \quad x_i = m_i^1 x_1 + b_i^1$$
$$\ldots$$
$$l_{1N}: \quad x_N = m_N^1 x_N + b_N^1.$$

The line l given by (1) is represented in parallel coordinates by the points $$(\bar{l}_{i-1,i}) = \left( \frac{(i-2)(1-m_i) + 1}{1 - m_i}, \frac{b_i}{1 - m_i} \right). \tag{3}$$

The line l given by (2) is represented by the points $$(\bar{l}_{1i}) = \left( \frac{i-1}{1 - m_i^1}, \frac{b_i^1}{1 - m_i^1} \right) \tag{4}$$

for i=2, . . . , N.

If two points determine a line, even in N-space, then how would a pair of lines (trajectories) intersecting in N-space appear on the parallel N-coordinate plane? The answer by analogy in 2-space or in 3-space is that a pair of straight lines intersect at a point. Thus, the intersection point in N-space would be represented in a parallel N-coordinate plane as a polygonal line. In this regard, FIG. 13 shows the polygonal line representation of the point of intersection of two lines in 5-space using the above-mentioned base variable, while FIG. 14 relies upon the adjacent variable form.

Consider two lines l, l′ given by $$l, l_{1i}: x_i = m_i x_1 + b_i \tag{5}$$
$$l', l'_{1i}: x_i = m'_i x_1 + b'_i$$

for i=2, . . . , N. While the intersection of two lines in $R^N$ is rare, there is $l \cap l' = P \longleftrightarrow$ $$\frac{b'_i - b_i}{m'_i - m_i} = \alpha, \forall i = 2, \ldots, N \text{ and } x_1(P) = \alpha. \tag{6}$$

This leads to an intuitive construction. On the xy-plane, form the "construction" lines $\overline{P}^i$ joining $\bar{l}_{1i}$ to $\bar{l}_{1i}'$. Then, $$l \cap l' = P, x_1(P) = \alpha \quad \bigcap_{i=2}^{N} \bar{P}^i = (0, \alpha).$$

The $\bar{P}^i$'s must intersect on the $x_1$-axis since $x_1$ is the base variable used in the description (5). In fact, $P^i = (\alpha, p_i)$, where $x_i(P) = p_i$. The equivalent construction, based on the adjacent variable representation of the lines, is shown in FIG. 14. Specifically, $l \cap l' = P \longleftrightarrow \forall i = 1, \ldots, N-1$ $$\bar{P}^{i,i+1} \cap \bar{P}^{i+1,i+2} = (i, \alpha_i), \, x_i(P) = \alpha_i, \tag{7}$$

where now the line $\bar{P}^{i,i+1}$ joins the point $l_{i,i+1}$ to $l_{i,i+1}'$, and $P^{i,i+1} = (p_i, p_{i+1})$. The generalization to other line representations is direct. Clearly, these constructions can be used to verify nonintersection.

It appears desirable to not only ascertain collision points, but to ascertain a zone of either collision danger or avoidance between aircraft. This, in part, motivates the consideration of the proximity between a pair of lines 1 and 1' (trajectories) in N-space or $R^N$. The lines 1 and 1' are defined by $$l, l_1 : x_i = m_i x_1 + b_i$$

$$l', l_1' : x_i = m_i' x_1 + b_i' \tag{8}$$

$$m_1 = m_1' = 1, \, b_1 = b_1' = 0, \, i = 1, \ldots, N.$$

By this is meant finding the closest points, $P \in l$, $P' \in l'$, and the distance between them. Rather than using a more standard approach, consider "fitting" a sphere with center $P \in l$ and tangent to a point $P' \in l'$. The radius $r$ of this sphere is the distance between the two lines, and $P$ and $P'$ are the points in question. To accomplish this "fit", for any number $\alpha$ let $P \in l$ with $x_1(P) = \alpha$ and $S$ the sphere with radius $r$ and centered at $P$, i.e., $$S: \sum_{i=1}^{N} (x_i - m_i \alpha - b_i)^2 = r^2$$

$$S \cap l': \sum_{i=1}^{N} (m_i' \alpha' + b_i' - m_i \alpha - b_i)^2 = r^2.$$

Expanding and rearranging the above yields $$\alpha'^2 M' + 2\alpha'(D' - \alpha C) - 2\alpha D + \alpha^2 M + B = r^2 \tag{9}$$

where $$M' = \sum_{i=1}^{N} m_i'^2, \, M = \sum_{i=1}^{N} m_i^2, \, C = \sum_{i=1}^{N} m_i m_i', \tag{10}$$

$$B = \sum_{i=1}^{N} B_i^2, \, B_i = b_i' - b_i,$$

$$D = \sum_{i=1}^{N} B_i m_i, \, D' = \sum_{i=1}^{N} B_i m_i'.$$

The gist in (9) is the quadratic relationship between the three unknowns $\alpha$, $\alpha'$ and $r$. Completing the squares in $\alpha'$ and $\alpha$ and letting $Q = MM' - C^2$ results in $$QM'r^2 = Q(\alpha'M' + D' - \alpha C)^2 + \tag{11}$$

$$+ (\alpha Q + CD' - M'D)^2 -$$

-continued
$$-(CD' - DM')^2 + Q(BM' - D'^2).$$

Since $Q$ and $M'$ are nonnegative $$r^2 = B + D'\alpha' - D\alpha \tag{12}$$

gives the minimum distance which occurs when $$\alpha = \frac{DM' - CD'}{Q}, \quad \alpha' = \frac{CD - MD'}{Q}. \tag{13}$$

By the way, in $R^2$ with $m_2 \neq m_2'$ (12) yields the identity $r = 0$ since the lines intersect. The points $P$ and $P'$ determine the line n which is normal to both 1 and 1'

In applying the above to collision avoidance in ATC, it is useful to let $x_1$ in (8) be the time variable relabeled $t$. The factors of interest then are the closest points in time. They are given in terms of the time, say $x_1 = \alpha$, which minimizes $r$ and are found by a similar argument to be $$\alpha = (D - D')/M_2, \, r^2 = B + (D' - D)\alpha \tag{14}$$

for $M_2 = \sum_{i=2}^{N} (m_i' - m_i)^2.$

These results can be amended to obtain a line representation in terms of the coordinates of two of its points, and to obtain the proximity results above for intervals rather than for whole lines.

Referring again to FIGS. 2-11, several general advantages of the parallel 4-coordinate planar form of an ATC display should be stated explicitly. These include (a) unambiguous indication of the past, present, or future position of an aircraft trajectory; (b) assignment of trajectories for specified time intervals; (c) indication of flight deviation from the trajectory by transforming angular deviations into easily detectable lateral deviations of 1 or 2 points representing the aircraft's path; (d) detection and display of the time at which any pair of aircraft are closest, along with the position and distance at the closest approach; and (e) exhibiting properties of special trajectories as found, for example, where several aircraft occupy the same space path at different times with varying velocities.

Referring again to FIG. 2, it is apparent that an aircraft's trajactory is a function of three space variables (x1, x2, x3) and one temporal variable (t). Such a trajectory can be represented with three planar points T:1, 1:2, and 2:3. At any given time t, the position of the aircraft may be found on the parallel coordinate planar display as follows:

(a) find the line through the value t on the T axis and the point T:1,
(b) the intersection of the line in step (a) with the x1 axis yields the value for x1=a1,
(c) find the line through the value x1=a1 and the point 1:2,
(d) the intersection of the line in step (c) with th x2 axis yields the value for x2=a2, and
(e) repeat steps (c) and (d) with respect to finding a linear intersection with the x3 axis to find x3=a3.

The joining of this polygonal line associates the space and volume values. The corresponding situation for several aircraft is represented on the parallel coordinate plane in FIG. 3.

Figure 4:
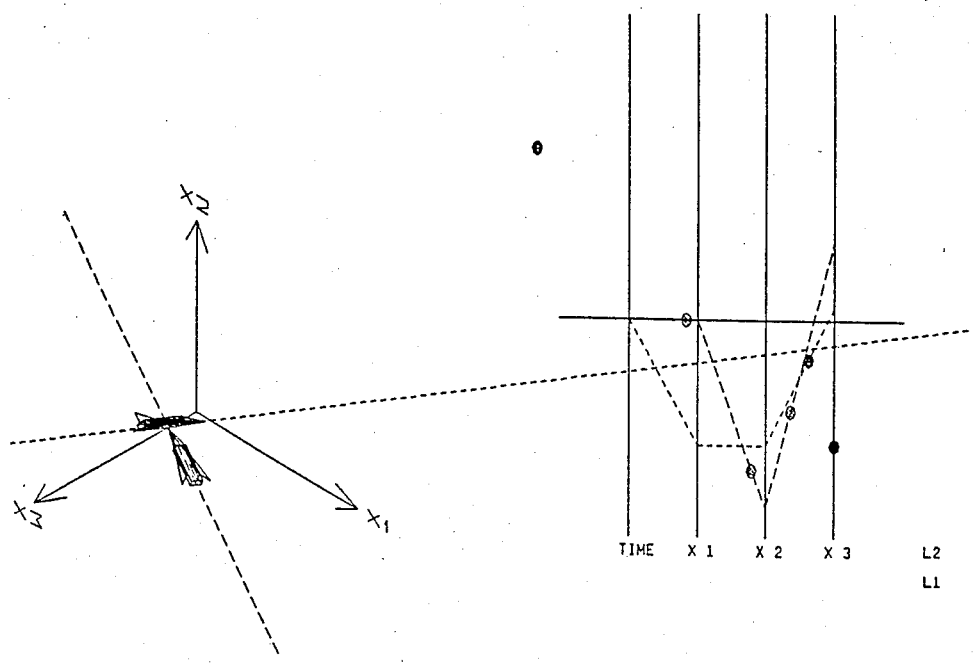

As mentioned, conventional isometric displays exhibit distortion. This is indicated in FIG. 4 on the left-hand side where the aircraft appear collision bound. However, their spatial separation is clear on the parallel coordinate planar diagram to the right.

Referring now to FIG. 5, there is shown an aircraft's angular deviation from an assigned trajectory as it appears on the electronic parallel N-coordinate planar display. It should be recalled that each point in N-space can be represented by a polygonal line and a counterpart set of line segments and their linear equations as in (3). The horizontal position of the points representing the trajectory is determined only from the quantities m(i). These can be interpreted as the slope of the line's projection on the 2-dimensional plane x(i), x(i+1), so that if x3 is the attitude of the aircraft, the ground position is described by x1, x2. An angular deviation from the true ground heading shows up as a lateral deviation of the point 1:2. In FIG. 5, an angular deviation of ±5 degrees from the assigned ground heading is shown as a horizontal range centered on the point 1:2 of each trajectory. The difference in interval lengths is due to the nonlinear scale of the angle. In this regard, the scale is linear only as the tangent m(i) of the angle.

Figure 6:
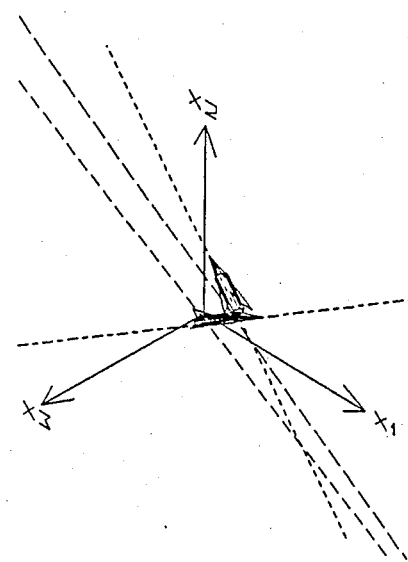
Figure 6:
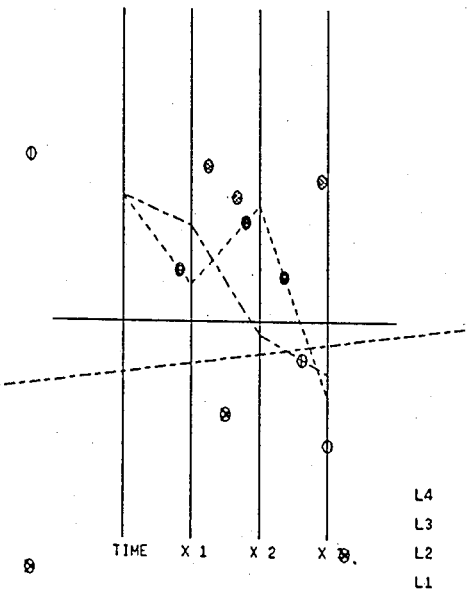
Figure 7:
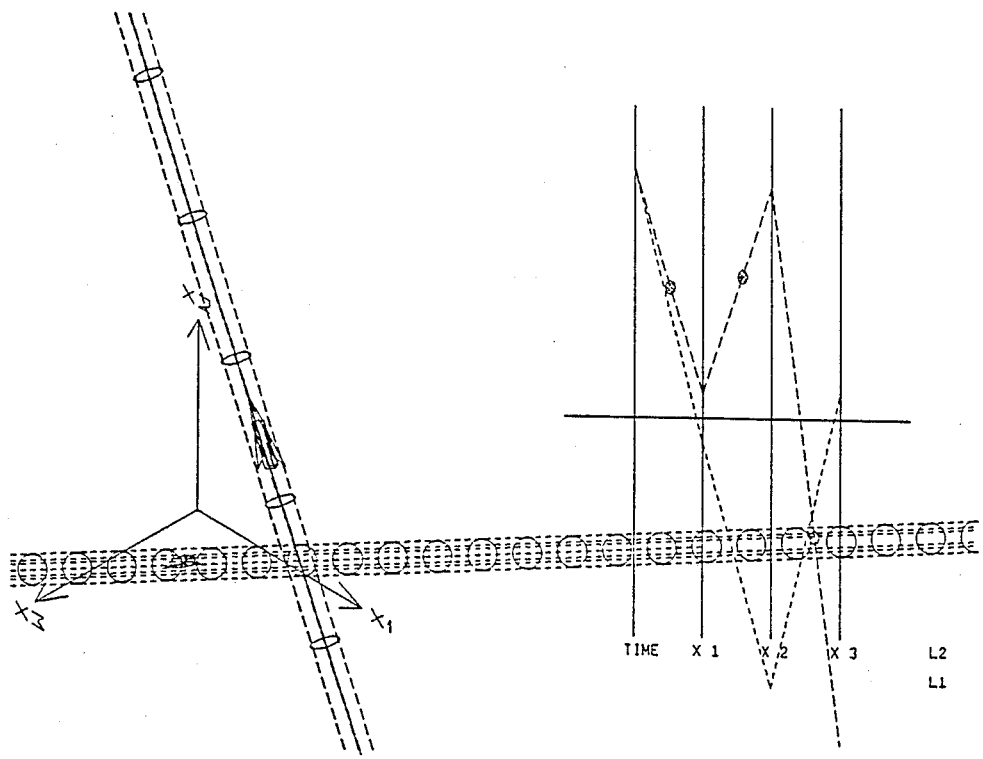

Referring now to FIGS. 6 and 7, there are contrasted the closest approach of two aircraft isometrically and in parallel coordinate planar view. The difference of FIG. 7 over FIG. 6 lies in that each aircraft is encased within a cylindrical envelope. The distance between the aircraft can be computed according to the relationship (14) with their positions otherwise determined. Note, prior to assigning any given trajectory, the closest approach to other trajectories can be ascertained to verify minimum acceptable separation. If the separation is not acceptable, then a prompt is activated to alert the operator and other trajectories with appropriate separation recommended.

Figure 8:
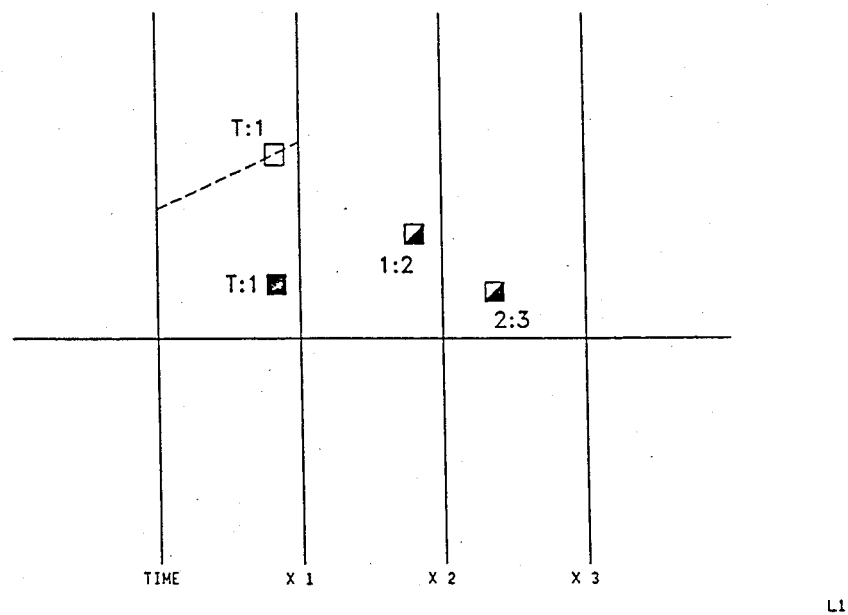

Referring now to FIG. 8, there is shown the parallel coordinate planar display of two aircraft flying on the same path but separated in time. This would be the case when flying between two omni stations. In FIG. 8, points 1:2 and 2:3 are shared since they describe the path. It is also known from the figure that the aircraft are flying with the same velocity since both points marked T:1 have the same horizontal coordinate. If, on the other hand, one point was between the T and x1 axes and the other point was outside, then they would be flying in opposite directions.

Figure 9:
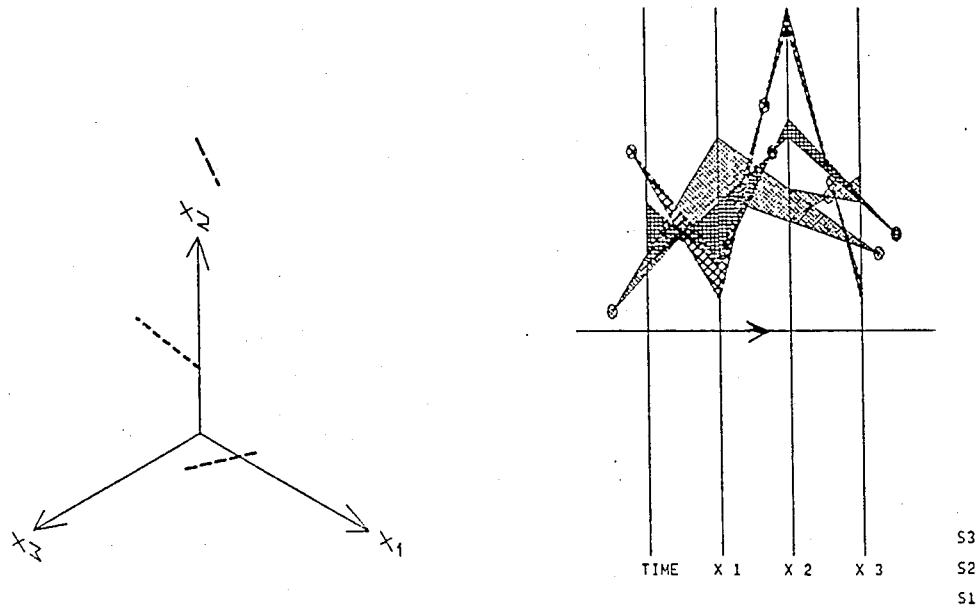
Figure 10:
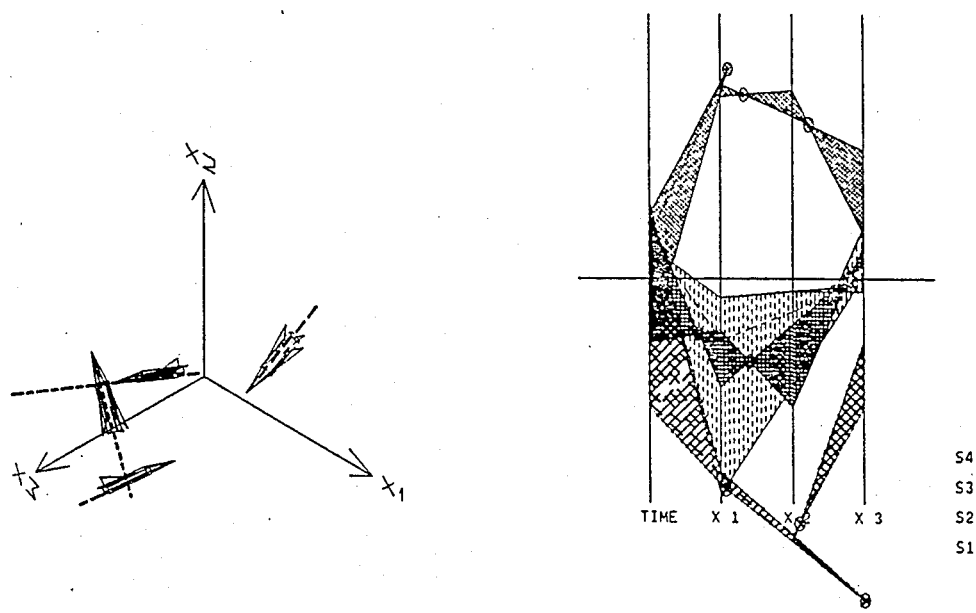
Figure 11:
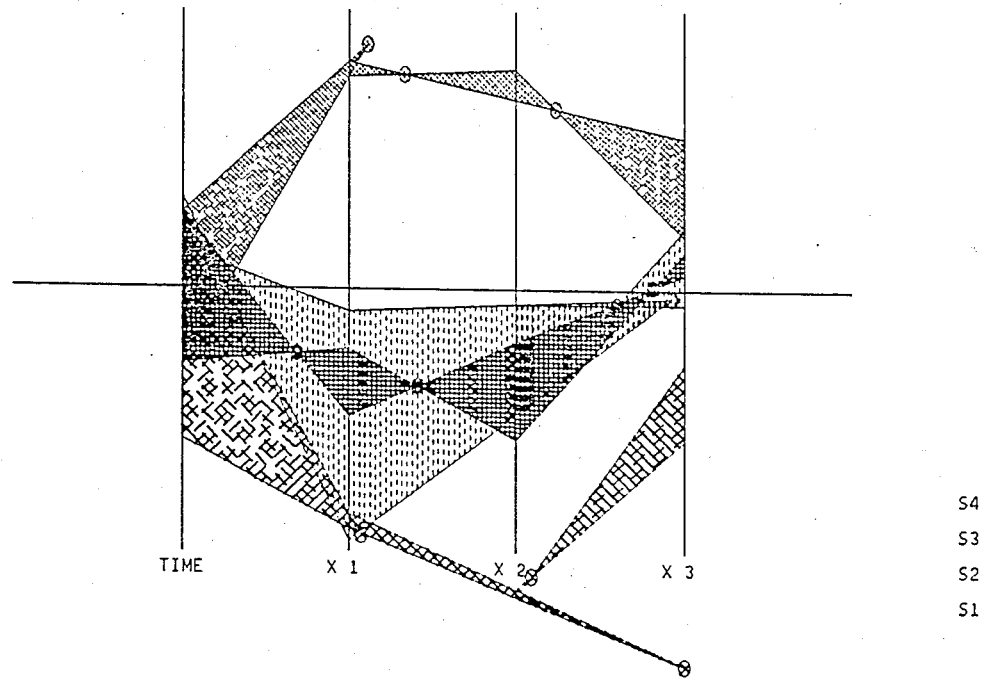

Referring now to FIGS. 9-11, there is shown contrast display of isometric and parallel coordinate plane displays of aircraft flying different straight-line segments. It is the case that an aircraft is assigned a trajectory for only a finite time interval. The isometric representations can only show if their paths intersect. This is acceptable as long as the aircraft do not pass through the same point in space at the same time. From parallel coordinates this, of course, can immediately be found. For space and time intersection, the points T:1, 1:2, and 2:3 must satisfy the intersection construction as set out above; while for path intersection, only the points 1:2 and 2:3 must satisfy the construction. This is clearly shown in FIGS. 10 and 11. In this invention, collision avoidance is based on this observation.

Figure 15:
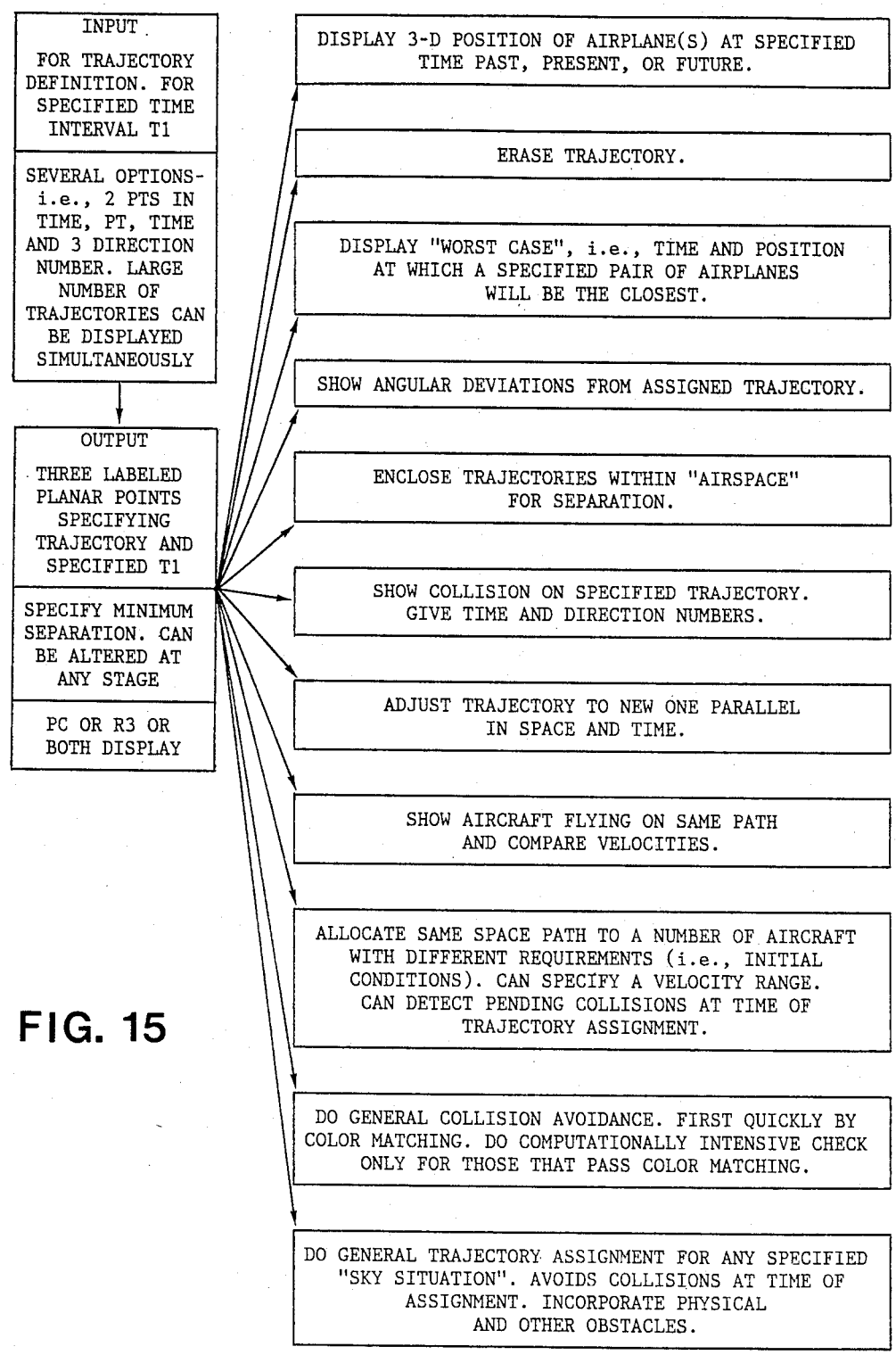

Referring now to FIG. 15, when taken together with the table, there is shown respectively the flow of control and implementing APL sequences in detecting and displaying aircraft trajectories, and ascertaining collision opportunities and avoidances. FIG. 15 sets out eleven activities performed by the processor and interactive display responsive to coded signals provided by the detection and ranging system. The coded signals define one or more aircraft trajectories.

The activities set out in FIG. 15 ascertain the state of the airspace in terms of (1) trajectories encased within a defined volume, and (2) prospective collisions. These are electronically mapped and displayed on the parallel N-coordinate plane as illustratively set out in FIGS. 4-11. These activities are conducted reiteratively so that in the event of either a pending collision or if the flight margins are too close, then one or more trajectories can be adjusted in space and time and redisplayed. Allocations and adjustments of space paths can then be communicated to affected aircraft.

The table sets out APL instruction sequences by which an APL processor and interactive display interface execute the steps of the method of this invention. This embodiment contemplates an interpretive processor. However, compiler-based language equivalents drawn in PASCAL, FORTRAN, and the like are believed to be well within the scope of the skilled artisan in view of this disclosure.

The APL language and machine performance characteristics are well appreciated. Reference should be made to Gilman et al, "APL: An Interactive Approach", 2nd Edition, John Wiley & Sons, Inc., copyright 1976. An excellent guide for appreciating the instruction sequence embodiment of APL2 is set out in the International Business Machines Corporation APL2 Language Manual, publication SB21-3015.

The APL embodiment operates through an arrangement of independently executable and callable modules/processes termed "defined functions". In this embodiment, the coded signals are placed into labeled vector buffers (LNS,AVAILNS). Also, this embodiment permits an operator, acting through one of the defined functions (AT) having a menued display interface, to select one of several processing options (ATΔOPTION1,3,4,6,16-20). For instance, one of the options, ATΔOPTION1, processes the coded signals and causes counterpart trajectories encased within defined volumes to be displayed on the parallel coordinate plane in the manner of FIG. 7. Warning indications are automatically flashed if predesignated margins are exceeded. Anothr option, ATΔOPTION16, causes angular deviations from assigned trajectories to be displayed in the manner of FIG. 5. Yet another option, ATΔOPTION3, causes a display of the closest points between two trajectories to be made in the manner of FIG. 6. Of interest is defined function ATΔOPTION19. This option causes any collision with an input trajectory to be displayed in the manner of FIGS. 10 and 11. In contrast, option ATΔOPTION20 ascertains and displays a path parallel to a given trajectory. Other performance attributes expressed in the APL sequences should be readily apparent from inspection thereof in the table.

TABLE 1

*****AT
```
      [0]    AT;D;A;C;CTR;T1;T2;LNS;AVAILNS;O;O1;O2;W;DIST;INTOSCRN
      [1]    α-------------------------------------------------------------
      [2]    α THE MAIN FUNCTION FOR THE AIR TRAFFIC CONTROL SYSTEM.
      [3]    α PERFORMS THE INTERACTION WITH THE USER, THROUGH BATCH INPUT.
      [4]    α LNS HOLDS THE INFO FOR THE LINES. LNS[I;;] REPRESENTS THE ITH
             α LINE.
      [5]    α LNS[I;J;1 2]←Mj Bj, [I;J;3 4] ←LAMBDAj
      [6]    α    [J;5]←1 IF ID IS DISPLAYED 0 O.W.
      [7]    α AVAILNS IS A VECTOR WITH THE ID OF LINES THAT ARE NOT USED.
             α FOR EXAMPLE
      [8]    α LINES ID 2 4 ARE USED AVAILNS MAY BE 5 2 1 3 0 (0 BECAUSE
             α ALWAYS
      [9]    α-------------------------------------------------------------
      [10]    ERASE
      [11]    TNOTFIX
      [12]    ATΔDRAWLOGO W← 0 0 50 30
      [13]    ⎕←'PLEASE ENTER THE DIMENSION: '
   φ[14]    D←φ⎕
      [15]    ⎕←'PLEASE ENTER THE SAFETY DISTANCE (IN THE RANGE ¯3,3): '
   φ[16]    DIST←φ⎕
      [17]
      [18]    αSET SCREEN
      [19]    INTOSCRN← 0 0 100 70
      [20]    W←0.4× ¯20 ¯20 150 75
      [21]
      [22]    αDRAW AXIS AND INITIALIZE DATA STRUCTURE
      [23]    ATΔDRAWAXIS D
      [24]    C←1
      [25]    LNS←(5,(D-1),5)ρ0
      [26]    AVAILNS← 1 5 ρι5
      [27]
      [28]    αINITIALIZE MENU
      [29]    O←'1/ENTER A LINE. 2/DISPLAY LINE ID. 3/FIND CLOSEST POINTS.
             4/ERASE LIN'
      [30]    O2←O,'E(S).5/RFRSH SCREEN. 6/ENTER TIME. 7/MOVE CLST PTS. 8/END
             PROGRAM.'
      [31]    O2←O2,'9/SHOW IN R3. 10/ENTER RANDOM LINE(S). 11/NO R3. 12/CHNG
             SCALE'
      [32]    O←O2← 3 74 ρO2,' 13/SHOW NEXT MENU.',100ρ' '
      [33]    O1←'14/DISPLAY 1ST MENU. 15/SHOW CYLINDERS. 16/SHOW ANGLE
             VARIATION'
      [34]    O1←O1,'17/ALLOCATE NEW PATH (GET SPEED). 18/NEW PATH GIVEN
             VELOCITY'
      [35]    O1←O1,'19/SHOW CLISON. 20/ALLOCATE A PARALLEL LINE. 21/I TO 1
             FORM.'
      [36]    O1← 3 64 ρO1,100ρ' '
      [37]
      [38]    αGET OPTION
      [39]    OPTIONS:
      [40]    FILL(5 2 ρ 1 0 99 0 99 7 1 7 1 0) USING COLOR 2
      [41]    2 0.5 1 WRITE O
      [42]    ⎕←'PLEASE ENTER A CHOICE FROM THE MENU BELOW (1-21): '
   φ[43]    A←φ⎕
      [44]    FILL(5 2 ρ 10 7 90 7 90 10 10 10 10 7) USING COLOR 8
```

```
→[45]    →(~Aει21)/OPTIONS
 [46]
 [47]    αCALL THE OPTION THE USER ASKED FOR AND ASSIGN THE OUTPUT FROM
 [48]    αTHE FUNCTION
φ[49]    φ'AVAILNS← 1 5 ρ(T1←(AVAILNS,DIST) ATΔOPTION',(φA),'
             LNS)[1;1;ι5]'
 [50]    LNS←(1 0 0)↓T1
→[51]    →OPTIONS
```

*****ATΔOPTION1

```
 [0]     LNSAV←DISTAVAILNS ATΔOPTION1 LNS;A;C;L;PL;AVAILNS;DIST;T1;T2;
         T3;T4
 [1]     α-----------------------------------------------------------------
 [2]     α DEFINITION OF TRAJECTORY.
 [3]     α LNSAV ROW 1 HAS THE NEW AVAILNS, IF ρ(LNSAV)[2]>5 IT HAS
         α APPENDING.
 [4]     α LNSAV ROW 2 TO D HAS THE NEW LINES.
 [5]     α-----------------------------------------------------------------
 [6]     αINITIALIZE LOCAL DATA STRUCTURE
 [7]     FIXVP TFIXSCRN INTOSCRN
 [8]     DIST←(1 ¯1)↑DISTAVAILNS
 [9]     AVAILNS←(0 ¯1)↓DISTAVAILNS
[10]     C←AVAILNS[1;1]
[11]     AVAILNS←(0 1)↓AVAILNS
[12]     AVAILNS←AVAILNS,0
[13]
[14]     αREAD IN A TRAJECTORY IN THE FORM OF D-1 PAIRS Mi,Bi.
[15]     O←'ENTER A VECTOR WITH ',(φD-1),' PAIRS Mi,Bi STARTING AT i=1.'
[16]     FILL( 5 2 ρ 1 0 99 0 99 7 1 7 1 0) USING COLOR 2
[17]     12 3 1 WRITE O
[18]     ▯←'THE TRAJECTORY (SEE BELOW): '
φ[19]    L←((D-1),2)ρ,φ▯
[20]
[21]     αOUTPUT THE TRAJECTORY BOTH IN R3 AND IN PC
[22]     FIXVP TFIXSCRN INTOSCRN
[23]     PL←(C+1) ATΔDRAWL L
[24]     LNS[C;;]←L,PL,0
[25]     FIXVP TFIXSCRN ¯10 ¯10 110 80
→[26]    →(INTOSCRN[1]≠50)/NOTR3
[27]     FIXVP 5 2 ρ 0 0 50 0 50 70 0 70 0 0
[28]     (C+1) ATΔDRAWLC LNS[C;; 1 2]
[29]     FIXVP TFIXSCRN ¯10 ¯10 110 80
[30]
[31]     αOUTPUT TRAJECTORY ONLY IN PC.
[32]     NOTR3:LNSAV←((1,(ρLNS)[2 3]ρAVAILNS, 1 10 ρ0),[1] LNS
[33]
[34]     αCHECK FOR SAFETY DISTANCE AGAINST ALL LINES
[35]     T1←1
[36]     T2←TMKV(~(ι5)εAVAILNS)/ι5
[37]     T4←0ρ0
→[38]    →((ρT2)=1)/0
→[39]    LOOP:→(T1>ρT2)/WRITEWARNING
→[40]    →(C=T2[T1])/AGAIN
[41]     T3←LNS[(ι0)ρ1↑C;; 1 2] ATΔFINDDIST LNS[(ι0)ρT2[T1];; 1 2]
→[42]    →(T3≥DIST)/AGAIN
[43]     T4←T4,T2[T1]
[44]     AGAIN:T1←T1+1
→[45]    →LOOP
```

```
[46]  WRITEWARNING:
→[47]  →((ρT4)=0)/0
[48]  T1←('LINE ',(⌽C),' IS TOO CLOSE TO LINE(S) ',⌽T4).
[49]  ('WARNING, WARNING!! ',T1) AT∆PUTERROR 10 6 3
```

*****AT∆OPTION16

```
[0]   AVAILNS AT∆OPTION16 LNS;A;B;C;T1;T2;T3;L;R
[1]   α------------------------------------------------
[2]   α DISPLAYS VARIATION IN ANGLES.
[3]   α------------------------------------------------
[4]
[5]   αGET TRAJECTORIES ID.
[6]   FILL(5 2 ρ 1 0 99 0 99 7 1 7 1 0) USING COLOR 8
[7]   ⎕←'ENTER THE TRAJECTORIES IDS FOR VARIATION: '
φ [8]   A←φ⎕
→ [9]   →(∧/Aε(~(ι5)εAVAILNS)/ι5)/LINEOK
[10]  ('LINE ',(⌽A),' IS NOT DEFINED.') AT∆PUTERROR 10 6 4
→[11]  →0
[12]  LINEOK:
[13]  ⎕←'ENTER THE ANGLE VARIATION FOR THE X2 X1 RELATION (IN
         DEGREES): '
φ[14]  B←φ⎕
[15]  C←1
[16]  T1←ρA←TMKV A
[17]  FIXVP TFIXSCRN INTOSCRN
[18]
[19]  αFIND THE PC DISTANCE THAT CORRESPONDS TO ANGLE VARIATION
[20]  αAND DISPLAY IT
→[21]  LOOP:→(C>T1)/EXIT
[22]  L←3○DTR B+RTD ¯3○LNS[(ι0)ρ1↑A;2;1]
[23]  L←(1+1+1-L),LNS[(ι0)ρ1↑A;2;4]
[24]  R←3○DTR(-B)+RTD ¯3○LNS[(ι0)ρ1↑A;2;1]
[25]  R←(1+1+1-R),LNS[(ι0)ρ1↑A;2;4]
[26]  L←((2 2 ρL)+ 2 2 ρ 0 1 0 ¯1),[1](1 2 ρL),[1](1 2 ρR)
[27]  L←L,[1](2 2 ρR)+ 2 2 ρ 0 1 0 ¯1
[28]  L←((¯2, 5.5,((ρLNS)[2]+2),5.5) INTO INTOSCRN) XFM L
[29]  DRAW L USING COLOR 1+1↑A
[30]  A←1↓A
[31]  .C←C+1
→[32]  →LOOP
[33]  EXIT:FIXVP TFIXSCRN ¯10 ¯10 110 80
```

*****AT∆OPTION17

```
[0]   AVAILNS AT∆OPTION17 LNS;A;A1;A2;T1;P;L1;L2
[1]   α------------------------------------------------
[2]   α ALLOCATES A PATH FOR AN AIRPLANE IN AN EXISTING PATH.
[3]   α------------------------------------------------
[4]
[5]   FILL(5 2 ρ 1 0 99 0 99 7 1 7 1 0) USING COLOR 8
[6]   ⎕←'CHOOSE AN EXISTING PATH FOR ALLOCATION: '
φ [7]   A←TMKVφ,⎕
→ [8]   →(∧/Aε(~(ι5)εAVAILNS)/ι5)/LINEOK
[9]   ('LINES ',(⌽A),' ARE NOT DEFINED.') AT∆PUTERROR 10 6 4
→[10]  →0
[11]
[12]  LINEOK:
[13]  ⎕←'ENTER THE INITIAL POSITION (TIME, X1): '
φ[14]  A1←φ⎕
```

```
       [15]   AG:□←'ENTER THE TIME INTERVAL TO AVOID COLLISION (THE TIME,X1
                 SLOPE): '
    φ[16]     A2←φ□
    →[17]     →((ρA2)≠2)/AG
       [18]   L1←1, 3 2 ρ0,A2[2],(,LNS[A;1; 3 4]),0,A2[1]
    →[19]     →(LNS[A;1;1]>0)/ON
       [20]
       [21]   αSHOW RANGE OF POSSIBLE VELOCITIES.
       [22]   L1←TGETΔLINE 2 2 ρ(,LNS[A;1; 3 4]),0,A2[1]
       [23]   L2←TGETΔLINE 2 2 ρ(,LNS[A;1; 3 4]),0,A2[2]
       [24]   L1← 2 3 ρ0,0,A2[1],1,1,(L1[1;1]+L1[1;2])
       [25]   L1←L1,[1] 2 3 ρ0,0,A2[2],1,1,(L2[1;1]+L2[1;2])
       [26]   ON:FIXVP TFIXSCRN INTOSCRN
       [27]   L1←((¯2,¯5.5,((ρLNS)[2]+2),5.5) INTO INTOSCRN) XFM L1
       [28]   DRAW L1 USING COLOR(A+1)
       [29]   L2←¯1.4,(0.1),¯1.5,0,¯1.4,(¯0.1),¯1.5,0
       [30]   L2←1, 8 2 ρL2,2.5,0,2.4,(0.1),2.5,0,2.4,(¯0.1)
       [31]   L2←(0,0,(RTD ¯3οA1[2]-A1[1])) ROTATE L2,0
       [32]   L2←L2[; 2 3]
       [33]   L2←(0,A1[1]) TRANSLATE L2
       [34]   L2←((¯2,¯5.5,((ρLNS)[2]+2),5.5) INTO INTOSCRN) XFM L2
       [35]   DRAW L2 USING COLOR(1+A),WIDTH 8
       [36]   FIXVP TFIXSCRN ¯10 ¯10 110 80
    →[37]     →0

*****ATΔOPTION18
       [0]    LNSAVAILNS←AVAILNS ATΔOPTION18 LNS;A;A1;A2;T1;T2;T3;T4
       [1]    α----------------------------------------------------------------
       [2]    α ALLOCATES A NEW PATH WITHIN AN EXISTING GIVEN VELOCITY.
       [3]    α----------------------------------------------------------------
       [4]
       [5]    LESSTHAN5:FILL(5 2 ρ 1 0 99 0 99 7 1 7 1 0) USING COLOR 8
       [6]    □←'CHOOSE AN EXISTING PATH FOR ALLOCATION: '
    φ [7]     A←TMKVφ,□
    →  [8]    →(∧/Aε(~(ι5)εAVAILNS)/ι5)/LINEOK
       [9]    ('LINE ',(⍕A),' IS NOT DEFINED.') ATΔPUTERROR 10 6 4
    →[10]     →0
       [11]
       [12]   αGET NEW PATH
       [13]   LINEOK:
       [14]   □←'ENTER NEW STARTING POSITION (TIME,X1): '
    φ[15]     A1←φ□
       [16]   T1←AVAILNS[1;1]
       [17]   AVAILNS←(0 1)↓AVAILNS,0
       [18]   T3←LNS[A;1;]
       [19]   LNS[T1;;]←LNS[A;;]
       [20]   T4←((¯2,¯5.5,((ρLNS)[2]+2),5.5) INTO INTOSCRN) XFM 1, 2 2
                 ρA1[1],1
       [21]
       [22]   αDRAW NEW PATH
       [23]   FIXVP TFIXSCRN INTOSCRN
       [24]   DRAW T4 USING COLOR 1+T1
       [25]   A1←,TGETΔLINE 2 2 ρ0,A1[1],1,A1[2]
       [26]   A1←LNS[A;1;3],(LNS[A;1;3]×A1[1])+A1[2]
       [27]   LNS[T1;1;]← 1 5 ρT3[1;1],(A1[2]×1÷T3[1;1]),A1,0
       [28]   (A,T1) ATΔPUTΔSQ LNS
       [29]   LNSAVAILNS←((1,(ρLNS)[2 3])ρ(,AVAILNS),200ρ0),[1] LNS
       [30]   FIXVP TFIXSCRN ¯10 ¯10 110 80
```

```
→[31]    →(INTOSCRN[1]≠50)/0
 [32]    FIXVP TFIXSCRN 0 0 50 70
 [33]
 [34]    αCOMPARE AIRPLANES AT A GIVEN TIME
 [35]    ⎕←'PLEASE ENTER TIME TO COMPARE PLANES: '
φ[36]    T4←φ⎕
 [37]    T2←LNS[(ι0)ρA;; 1 2] ZLINPOINT T4
 [38]    T3←LNS[(ι0)ρT1;; 1 2] ZLINPOINT T4
 [39]    LNS[(ι0)ρA;; 1 2] ATΔDRAWPRC(,T2),1+A
 [40]    LNS[(ι0)ρT1;; 1 2] ATΔDRAWPRC(,T3),1+T1
 [41]    FIXVP TFIXSCRN ¯10 ¯10 110 80

*****ATΔOPTION19
 [0]     LNSAVAILNS←AVAILNS ATΔOPTION19 LNS;A;A1;A2;A3;T1;T2;T3;T4;D
 [1]     α------------------------------------------------------------
 [2]     α SHOWS COLLISION WITH AN INPUT TRAJECTORY.
 [3]     α------------------------------------------------------------
 [4]
 [5]     αGET TRAJECTORY ID
 [6]     LESSTHAN5:FILL(5 2 ρ 1 0 99 0 99 7 1 7 1 0) USING COLOR 8
 [7]     ⎕←'CHOOSE A PATH FOR THE COLLISION (1 FOR LINE 1 ETC.): '
φ[8]     A1←TMKVφ,⎕
→[9]     →(∧/A1ε(~(ι5)εAVAILNS)/ι5)/LINEOK
 [10]    ('TRAJECTORY ',(φA1),' IS NOT DEFINED.') ATΔPUTERROR 10 6 4
→[11]    →0
 [12]
 [13]    LINEOK:
 [14]    αGET TIME AND DIRECTIONS FOR OTHER TRAJECTORY.
 [15]    D←(ρLNS)[2]
 [16]    ⎕←'PLEASE ENTER THE TIME FOR THE COLLISION (IN THE (¯3,3))
            RANGE: '
φ[17]    A←φ,⎕
 [18]    T2←A1
 [19]    T3←'PLEASE ENTER THE ',(φD),' SLOPES DEFINING THE NEW PATH'
 [20]    ⎕←T3,' (',(φD),'-TUPLE): '
φ[21]    A3←A2←Dρφ,⎕
 [22]
 [23]    αFIND POINT OF COLLISION
 [24]    A2[(A2=1)/ιD]←A2[(A2=1)/ιD]+1E¯6
 [25]    A2←(¯1+ιD)+1+1-A2
 [26]    T1←LNS[(ι0)ρT2;; 1 2] ZLINPOINT A
 [27]    T3←TGETΔLINE(((D+1),1)ρ¯1+ιD+1),((D+1),1)ρT1
 [28]    T4←T3←(T3[;1]×A2)+T3[;2]
 [29]    T3←T3×1-A3
 [30]
 [31]    αDRAW COLLISION
 [32]    FIXVP TFIXSCRN INTOSCRN
 [33]    STAM←STAM,7 ATΔDRAWL STAM←((D,1)ρA3),((D,1)ρT3)
 [34]    LNS[(ι0)ρAVAILNS[1;1];;]←STAM,0
 [35]    AVAILNS←AVAILNS[1; 2 3 4 5],0
 [36]    LNSAVAILNS←((1,(ρLNS)[2 3])ρ(,AVAILNS),200ρ0),[1] LNS
 [37]    (1+,T2) ATΔDRAWP T1
 [38]    FIXVP TFIXSCRN ¯10 ¯10 110 80
→[39]    →(INTOSCRN[1]≠50)/NOTR3
 [40]    FIXVP TFIXSCRN 0 0 50 70
 [41]    7 ATΔDRAWLC((D,1)ρA3),((D,1)ρT3)
 [42]    LNS[(ι0)ρT2;; 1 2] ATΔDRAWPRC T1,T2+1
 [43]    (((D,1)ρA3),(D,1)ρT3) ATΔDRAWPRC T1,7
```

```
    [44]    FIXVP TFIXSCRN  10  10 110 80
    [45]    NOTR3:

*****AT∆OPTION20
    [0]     LNSAVAILNS←AVAILNS AT∆OPTION20 LNS;A;T1;T2;D
    [1]     α-----------------------------------------------------------
    [2]     α FIND A PARALLEL PATH TO A GIVEN TRAJECTORY.
    [3]     α-----------------------------------------------------------
    [4]
    [5]     αGET TRAJECTORY ID
    [6]     LESSTHAN5:FILL(5 2 ρ 1 0 99 0 99 7 1 7 1 0) USING COLOR 8
    [7]     ⎕←'CHOOSE A TRAJECTORY FOR PARALLEL REALLOCATION: '
  φ [8]     A1←TMKVφ,⎕
  → [9]     →(∧/A1ε(~(ι5)εAVAILNS)/ι5)/LINEOK
    [10]    ('LINE ',(⌽A1),' IS NOT DEFINED.') AT∆PUTERROR 10 6 4
  →[11]     →0
    [12]
    [13]    LINEOK:
    [14]    D←(ρLNS)[2]
    [15]    ⎕←'PLEASE ENTER THE ',(⌽D-1),' TRANSLATION FACTORS
            (dX1,dX2,...):'
  φ[16]     A←Dρφ,⎕
    [17]
    [18]    αDRAW NEW PATH
    [19]    FIXVP TFIXSCRN INTOSCRN
    [20]    STAM←STAM,7 AT∆DRAWL STAM←LNS[(ι0)ρA1;;]+0,((D,1)ρA),(D,3)ρ0
    [21]    LNS[(ι0)ρAVAILNS[1;1];;]←STAM[; 1 2 5 6 7]
    [22]    AVAILNS←AVAILNS[1; 2 3 4 5],0
    [23]    LNSAVAILNS←((1,(ρLNS)[2 3])ρ(,AVAILNS),200ρ0),[1] LNS
    [24]    FIXVP TFIXSCRN  10  10 110 80
  →[25]     →(INTOSCRN[1]≠50)/NOTR3
    [26]    FIXVP TFIXSCRN 0 0 50 70
    [27]    7 AT∆DRAWLC LNS[((ι0)ρAVAILNS[1])-1;; 1 2]
    [28]    FIXVP TFIXSCRN  10  10 110 80
    [29]    NOTR3:

*****AT∆OPTION3
    [0]     AVAILNS AT∆OPTION3 LNS;A;A1;A2;T1;P
    [1]     α-----------------------------------------------------------
    [2]     α DISPLAYS THE CLOSEST POINTS BETWEEN TWO TRAJECTORIES.
    [3]     α-----------------------------------------------------------
    [4]     FILL(5 2 ρ1 0 99 0 99 7 1 7 1 0) USING COLOR 8
    [5]     ⎕←'CHOOSE A PAIR OF LINES FOR CLOSEST POINTS (1 3 FOR LINES
            1 3..): '
  φ [6]     A←TMKVφ,⎕
  → [7]     →(∧/Aε(~(ι5)εAVAILNS)/ι5)/LINEOK
    [8]     ('LINES ',(⌽A),' ARE NOT DEFINED.') AT∆PUTERROR 10 6 4
  → [9]     →0
    [10]    LINEOK:
    [11]
    [12]    αZLINETER1 FINDS THE CLOSEST POINT IN TIME
    [13]    T1←(¯1 0)↓LNS[A[1];;] ZLINTER1 LNS[A[2];;]
    [14]
    [15]    αDRAW POINTS AND AIRPLANES.
    [16]    FIXVP TFIXSCRN INTOSCRN
    [17]    (A[1]+1) AT∆DRAWP T1[1;]
    [18]    (A[2]+1) AT∆DRAWP T1[2;]
    [19]    FIXVP TFIXSCRN  10  10 110 80
  →[20]     →(INTOSCRN[1]≠50)/0
```

```
[21]    FIXVP TFIXSCRN 0 0 50 70
[22]    LNS[A[1];; 1 2] ATΔDRAWPRC(,T1[1;]),A[1]+1
[23]    LNS[A[2];; 1 2] ATΔDRAWPRC(,T1[2;]),A[2]+1
[24]    FIXVP TFIXSCRN ¯10 ¯10 110 80
```

*****ATΔOPTION4
```
  [0]    LNSAV←AVAILNS ATΔOPTION4 LNS;A;T1;T2
  [1]    α-----------------------------------------------------------
  [2]    α ERASES TRAJECTORIES FROM THE SCREEN AND DATA STRUCTURE.
  [3]    α LNSAV IS THE SAME AS IN ATΔOPTION2 LOOK THERE FOR DESCRIPTION.
  [4]    α-----------------------------------------------------------
  [5]    FILL(5 2 ρ 1 0 99 0 99 7 1 7 1 0) USING COLOR 8
  [6]    ⎕←'CHOOSE TRAJECTORIES TO ERASE (1 3 FOR TRAJECTORIES 1 3,
         ETC.): '
φ [7]    T1←A←φ⎕
  [8]
  [9]    αCHECK TO SEE WHETHER THE INPUT TRAJECTORIES ARE ON THE SCREEN
→[10]    →(∧/Aε(~(ι5)εAVAILNS)/ι5)/LINEOK
 [11]    ('TRAJECTORIES ',(φA),' ARE NOT DEFINED.') ATΔPUTERROR 10 6 4
 [12]    LNSAV←((1,(ρLNS)[2 3])ρAVAILNS, 1 2000 ρ0),[1] LNS
→[13]    →0
 [14]
 [15]    αERASE THE LINES FROM THE SCREEN
 [16]    LINEOK:
 [17]    LNS[A;;]←0
 [18]    AVAILNS← 1 5 ρ(,A),,AVAILNS
 [19]    LNSAV←((1,(ρLNS)[2 3])ρAVAILNS, 1 200 ρ0),[1] LNS
```

*****ATΔOPTION6
```
  [0]    AVAILNS ATΔOPTION6 LNS;A;T1;T2;C;STAM
  [1]    α-----------------------------------------------------------
  [2]    α DISPLAYS ALL THE TRAJECTORIES AT A GIVEN TIME PARAMETER.
  [3]    α IF INTOSCRN=50 0 100 70 ALSO DISPLAYS IN CARTISIAN COORDINATES.
  [4]    α-----------------------------------------------------------
  [5]    FILL(5 2 ρ 1 0 99 0 99 7 1 7 1 0) USING COLOR 8
  [6]    ⎕←'PLEASE ENTER THE TIME (IN THE (¯3,3)) RANGE: '
φ [7]    A←φ,⎕
  [8]    C←1
  [9]    T2←TMKV(~(ι5)εAVAILNS)/ι5
 [10]
→[11]    LOOP:→(C>+/AVAILNSε0)/EXIT
 [12]
 [13]    αGET THE FULL 4D POINT FROM THE TRAJECTORY AND INPUT TIME.
 [14]    T1←LNS[(ι0)ρ1↑T2;; 1 2] ZLINPOINT A
 [15]
 [16]    αDRAW POINT IN TIME
 [17]    FIXVP TFIXSCRN INTOSCRN
 [18]    (1+,1↑T2) ATΔDRAWP T1
 [19]    FIXVP TFIXSCRN ¯10 ¯10 110 80
→[20]    →(INTOSCRN[1]≠50)/NOTR3
 [21]    FIXVP TFIXSCRN 0 0 50 70
 [22]    α(1+,1↑T2) ATΔDRAWPC T1
 [23]    LNS[(ι0)ρ1↑T2;; 1 2] ATΔDRAWPRC T1,(1+,1↑T2)
 [24]    FIXVP TFIXSCRN ¯10 ¯10 110 80
 [25]    NOTR3:T2←1↓T2
 [26]    C←C+1
→[27]    →LOOP
```

```
*****LXΔ
    [0]    LXΔ
    [1]    COIBM
    [2]   -'TO AVOID NAME CONFLICTS, IN THIS WORKSPACE'
    [3]    '    ABSTRACT IS NAMED ABSTRACTPRINT'
    [4]    '    DESCRIBE IS NAMED DESCRIBEPRINT'
    [5]    '    HOW IS NAMED HOWPRINT'
```

Various additional modifications and adaptations of the present invention will suggest themselves to those skilled in this art. The foregoing description is considered illustrative.

We claim:

1. A method for displaying, at a display interface coupled to a processor, position and motion information among objects in three-dimensional space, comprising the processor-controlled steps of:

generating and displaying at the interface a parallel coordinate plane having a plurality of axes, including a velocity axis and, orthogonal thereto, four parallel coordinate axes comprising three axes representing spatial dimensions and one axis representing a temporal dimension; and displaying on said parallel coordinate plane a plurality of multi-segmented lines, each multi-segmented line forming a unique representation of the position and motion information of one of said objects so that separation between said multi-segmented lines in one of said parallel coordinates can be detected as indicative of a lack of a conflict between the positions of the objects.

2. The method of claim 1, wherein the step of displaying multi-segmented lines comprises:

displaying on said parallel coordinate plane a first pair of multi-segmented lines, each line representing a set of points designating the position and motion information of a first of said objects at an end of a designated segment of its trajectory, so that the first area bounded by said first pair of multi-segmented lines represents the designated segment of trajectory for said first object; and displaying on said parallel coordinate plane a second pair of multi-segmented lines, each line representing a set of points designating the position and motion information of a second of said objects at an end of a designated segment of its trajectory, so that the second area bounded by said second pair of multi-segmented lines represents the designated segment of trajectory for said second object.

3. The method of claim 2, additionally comprising determining said first and second objects have conflicting trajectories if said first and second areas have no discernible separation on any of said parallel coordinate axes.

4. The method of claim 3, additionally comprising causing visible indication on said interface of trajectories whose discernible separation as mapped onto at least one parallel coordinate in the planar display is less than a predetermined amount.

5. A method of displaying the trajectories of first and second aircraft through three dimensional space, comprising:

generating in a processor and displaying at a user interface a parallel coordinate plane having a plurality of axes, including a velocity axis and, orthogonal thereto, four parallel coordinate axes including three axes representing spatial dimensions and one axis representing a temporal dimension;

generating in said processor and displaying on said parallel coordinate plane first and second multi-segmented lines, each line representing a unique set of points representing the position and motion information of a respective one of said aircraft; and determining whether separation exists between said multi-segmented lines in at least one of said parallel coordinates to determine whether a conflict exists between the trajectories of the first and second aircraft.

6. The method of claim 5, wherein said first multi-segmented line represents the position and motion information of said first aircraft at a point on its trajectory, and said second multi-segmented line represents the position and motion information of said second aircraft at a point on its trajectory, and said method additionally comprises:

generating in said processor and displaying at said interface on said parallel coordinate plane a third multi-segmented line representing a set of points representing the position and motion information of said first aircraft at another point on its trajectory so that a first area bounded by said first and third multi-segmented lines represents a segment of the trajectory of said first aircraft;

generating in said processor and displaying at said interface on said parallel coordinate plane a fourth multi-segmented line representing a set of points representing the position and motion information of said second aircraft at another point on its trajectory, so that a second area bounded by said second and fourth multi-segmented lines represents a segment of the trajectory of said second aircraft; and determining if said first and second bounded areas have any discernible separation on at least one of said parallel coordinates.

7. A method of determining potential conflict between two N-dimensional processes comprising:

generating in a processor and displaying at an interface an N-axes parallel coordinate plane having N parallel axes, each representative of one of said N dimensions;

generating in said processor and displaying at said interface on said paralel coordinate plane a first polygonal line representing a first N-tuple, said first N-tuple being a multivariate data point of a first process, and said first polygonal line intersecting each of said parallel coordinates;

generating in said processor and displaying at said interface on said parallel coordinate plane a second polygonal line representing a second N-tuple, said second N-tuple being a multivariate data point in a second process, said second polygonal line intersecting each of said parallel coordinates;

determining if a predetermined relationship exists between said first and second polygonal lines at any of said parallel coordinates.

8. The method of claim 7 wherein:

said first and second processes are the trajectories of first and second objects in space;

said N dimensions include three spatial dimensions and a temporal dimension;

said first polygonal line represents a point in space and time on the trajectory of said first object;

said second polygonal line represents a point in space and time on the trajectory of said second object;

said step of determining if a predetermined relationship exists between said first and second polygonal lines comprises determining if said first and second lines intersect any of said parallel axes at different points.

9. The method of claim 8 wherein said first and second objects include first and second aircraft, respectively.

10. The method of claim 7, additionally comprising:

generating in said processor and displaying at said interface on said parallel coordinate plane a third polygonal line representing a third N-tuple, said third N-tuple being a multivariate data point in said first process, different from said data point of said first N-tuple, and thus forming on said parallel coordinate plane a first bounded area representative of a feasible segment of said first process;

generating in said processor and displaying at said interface on said parallel coordinate plane a fourth polygonal line representing a fourth N-tuple, said fourth N-tuple being a multivariate data point in said second process, different from said data point of said second bounded area representative of a segment of said second process; and wherein said step of determining if a predetermined relationship exists between said first and second polygonal lines comprises determining if a predetermined relationship exists between said first and second bounded areas.

11. The method of claim 10, wherein:

said first and second processes are the trajectories of first and second aircraft;

said N dimensions include three spatial dimensions and a temporal dimension;

said first and third polygonal lines represent points in space and time on the trajactory of said first aircraft;

said second and fourth polygonal lines represent points in space and time on the trajectory of said second aircraft; and said step of determining if a predetermined relationship exists between said first and second bounded areas comprises determining if said first and second bounded areas have any discernible separation.

* * * * *

UNITED STATES PATENT AND TRADEMARK OFFICE
CERTIFICATE OF CORRECTION

PATENT NO. : 4,823,272

DATED : April 18, 1989

INVENTOR(S) : A. Inselberg

It is certified that error appears in the above-identified patent and that said Letters Patent is hereby corrected as shown below:

IN THE SPECIFICATION

Column 1, line 35, "3,996,950" should be --3,996,590--.

Column 2, line 9, "characterise" should be --characterize--.

Column 3, line 35, "N-tuple, and N-tuple" should be --N-tuple, said N-tuple--.

Column 8, line 61, "th" should be --the--.

Column 8, line 66, "volume" should be --time--.

Column 10, line 52, "Anothr" should be --Another--.

IN THE CLAIMS

Column 26, line 53, "paralel" should be --parallel--.

Signed and Sealed this

Thirteenth Day of March, 1990

Attest:

JEFFREY M. SAMUELS

*Attesting Officer* — *Acting Commissioner of Patents and Trademarks*